US010088068B2

(12) United States Patent
Marocchini et al.

(10) Patent No.: US 10,088,068 B2
(45) Date of Patent: Oct. 2, 2018

(54) FLEXURES FOR FLOW REGULATION DEVICES

(71) Applicant: Hamilton Sundstrand Corporation, Charlotte, NC (US)

(72) Inventors: Francis P. Marocchini, Somers, CT (US); Aaron F. Rickis, Feeding Hills, MA (US); Elise N. Zimmerman, West Hartford, CT (US)

( * ) Notice: Subject to any disclaimer, the term of this patent is extended or adjusted under 35 U.S.C. 154(b) by 0 days.

(21) Appl. No.: 14/862,553

(22) Filed: Sep. 23, 2015

(65) Prior Publication Data

US 2017/0082213 A1    Mar. 23, 2017

(51) Int. Cl.

| F16F 1/18 | (2006.01) |
| H01H 5/30 | (2006.01) |
| F16K 31/06 | (2006.01) |
| F16K 27/02 | (2006.01) |

(52) U.S. Cl.
CPC .......... *F16K 31/0655* (2013.01); *F16K 27/02* (2013.01)

(58) Field of Classification Search
CPC .. F16F 1/025; F16F 1/027; F16F 1/324; F16F 1/326; F16F 1/428; F16F 2236/027; F16K 31/0655; F16K 15/08; F16K 15/12; Y10T 137/7929; Y10T 74/18904; G11B 7/0932; F01L 25/08; F01L 35/00; F02M 51/0632; F02M 51/0635; F04B 53/00; G05B 2219/41143; G05B 2219/41311; H01H 5/30
USPC ......................................... 267/158, 160, 161
See application file for complete search history.

(56) References Cited

U.S. PATENT DOCUMENTS

| 2,407,757 A * | 9/1946 | MacCallum .......... F16D 27/112 |
| | | 192/200 |
| 2,632,791 A * | 3/1953 | Side ...................... G01R 19/18 |
| | | 310/25 |
| 2,690,529 A * | 9/1954 | Lindblad ............... H01F 7/1638 |
| | | 267/160 |
| 3,250,293 A * | 5/1966 | Adams ................. G05D 7/0635 |
| | | 137/489 |
| 3,921,670 A * | 11/1975 | Clippard, Jr. ....... F16K 31/0606 |
| | | 137/625.27 |
| 4,203,554 A * | 5/1980 | Zimmer ................ B05B 1/3046 |
| | | 239/583 |
| 4,482,986 A * | 11/1984 | Noda .................... G11B 7/0932 |
| | | 359/824 |
| 4,535,816 A * | 8/1985 | Feder .................. F16H 61/0251 |
| | | 137/625.65 |
| 4,771,808 A * | 9/1988 | Rodger ............... F16K 31/0658 |
| | | 137/613 |
| 4,891,479 A * | 1/1990 | Davis ...................... H01H 5/30 |
| | | 200/81 R |

(Continued)

FOREIGN PATENT DOCUMENTS

EP         1536169 A1 *  6/2005   ......... F16K 31/0655

*Primary Examiner* — Seth W Mackay-Smith
(74) *Attorney, Agent, or Firm* — Locke Lord LLP; Scott D. Wofsy; Christopher J. Cillié

(57) ABSTRACT

A flexure includes a flexure body with an inner ring defining a main axis and an outer ring extending about the inner ring that is outboard of the inner ring with respect to the main axis. One or more flexure members having respective lengths that are greater than a radial offset distance defined between the inner ring and the outer ring connects the inner ring to the outer ring. A valve includes a valve member connected to a valve body by the flexure.

13 Claims, 3 Drawing Sheets

(56) References Cited

U.S. PATENT DOCUMENTS

| | | | | |
|---|---|---|---|---|
| 4,941,254 A * | 7/1990 | Davis | ............... | H01H 5/30 |
| | | | | 200/407 |
| 4,954,799 A * | 9/1990 | Kumar | ............... | H01F 7/13 |
| | | | | 251/129.08 |
| 5,149,150 A * | 9/1992 | Davis | ............... | H01H 5/30 |
| | | | | 200/83 R |
| 5,361,243 A * | 11/1994 | Kasahara | ............... | G11B 7/08582 |
| | | | | 267/161 |
| 5,374,029 A * | 12/1994 | Bailey | ............... | F16K 31/0606 |
| | | | | 137/613 |
| 5,513,832 A | 5/1996 | Becker et al. | | |
| 6,343,751 B1 * | 2/2002 | Ito | ............... | F02M 51/0667 |
| | | | | 239/585.1 |
| 6,601,784 B2 | 8/2003 | Muller-Girard, Jr. et al. | | |
| 6,655,611 B2 | 12/2003 | Muller-Girard, Jr. et al. | | |
| 7,590,341 B2 * | 9/2009 | Iijima | ............... | G02B 7/026 |
| | | | | 396/133 |
| 8,511,337 B2 * | 8/2013 | Nishimura | ............... | F16K 1/42 |
| | | | | 137/487.5 |
| 8,876,094 B1 * | 11/2014 | Ridgeway | ............... | F16F 1/34 |
| | | | | 267/160 |
| 8,960,655 B2 * | 2/2015 | Wood | ............... | F16F 1/027 |
| | | | | 267/159 |
| 9,382,942 B2 * | 7/2016 | Sakon | ............... | F16C 35/063 |
| 2006/0231785 A1 * | 10/2006 | Hans | ............... | F16K 31/0651 |
| | | | | 251/129.21 |
| 2014/0008557 A1 * | 1/2014 | Vandamme | ............... | F16F 1/027 |
| | | | | 251/129.15 |
| 2014/0216064 A1 | 8/2014 | Champagne | | |

* cited by examiner

FLEXURES FOR FLOW REGULATION DEVICES

BACKGROUND OF THE INVENTION

1. Field of the Invention

The present disclosure relates to flow regulation devices, and more particularly to flexure members for flow regulation in fluid systems such as in aircraft fuel systems.

2. Description of Related Art

Fluid distribution systems commonly employ valves like pressure regulating valves to control the flow of fluid within the system. Some valves employ movable members that are displaceable relative to a valve body to control fluid flow. Such valves typically employ a biasing element that exerts force against the movable member to provide certain functions, such as to bias the position of the movable element relative to the valve body. The biasing elements typically have a structure that is selected to generate forces and movements suitable for a given valve application.

Such conventional valves and valve biasing members have generally been considered satisfactory for their intended purpose. However, there is still a need in the art for improved valve biasing members. The present disclosure provides a solution for this need.

SUMMARY OF THE INVENTION

A flexure includes a flexure body with an inner ring defining a main axis and an outer ring extending about the inner ring that is outboard of the inner ring with respect to the main axis. One or more flexure members having respective lengths that are greater than a radial offset distance defined between the inner ring and the outer ring connects the inner ring to the outer ring.

In certain embodiments, the inner ring can be substantially coplanar with the outer ring. The outer ring can include a lunate portion at which the flexure arm connects to the outer ring. The lunate portion can span an angle of less than 90 degrees, can include an aperture for receiving a fixation fastener, and/or can have an axial thickness that is less than the axial thickness of the remainder of the outer ring. The flexure can be substantially coplanar with the both the inner ring and the outer ring. An axial thickness of the flexure member can be less than the axial thickness of either or both the inner ring and the outer ring. The flexure member can have width that is greater than the axial thickness of the flexure to provide a relatively stiff radial spring rate. It is contemplated that the flexure member can trace an arcuate path defined between the inner ring and the outer ring.

In accordance with certain embodiments, the flexure member can span an angle about the main axis that is greater than about 30 degrees. The flexure member can span an angle about the main axis that is about 180 degrees. A portion of the flexure member can have a segment with a radius of curvature that is smaller than a radius of curvature of the outer ring. A portion of the flexure member can have a segment with a radius of curvature that is smaller than a radius of curvature of the inner ring. It is also contemplated that the flexure member can support the inner ring relative to the outer ring in a cantilevered or simply supported arrangement.

It is also contemplated that, in accordance with certain embodiments, the flexure member can be a first flexure member and the flexure can include a second flexure member. The second flexure member can connect the inner ring with the outer ring. The second flexure member can mirror the first flexure relative to a symmetry axis extending across the flexure body and intersecting the main axis. The second flexure member can connect the inner ring on a side of the symmetry axis opposite a location where the first flexure member connects to the inner ring. The first and second flexure members can connect to the outer ring on a common side of the main axis. The first and second flexure members can join the outer ring with an angular separation that is about 90 degrees relative to the main axis.

A valve includes a valve body, a movable armature seated within the valve body, and a valve member coupled the armature and movable between first and second positions to meter fluid flow through the valve body. A solenoid is seated within the valve body and is operably associated with the valve member through the armature to move the valve member between the first and second positions. A flexure as described above is disposed within the valve body with the inner ring coupled to the valve member and the outer ring fixed to the valve body such that the flexure exerts relative high radial centering forces on the valve member and relatively little axial force on the valve member. In embodiments, a resilient member can be connected between the inner ring and the core for providing axial force to the valve member. The resilient member can have an axial spring rate that is greater than an axial spring rate of the flexure.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
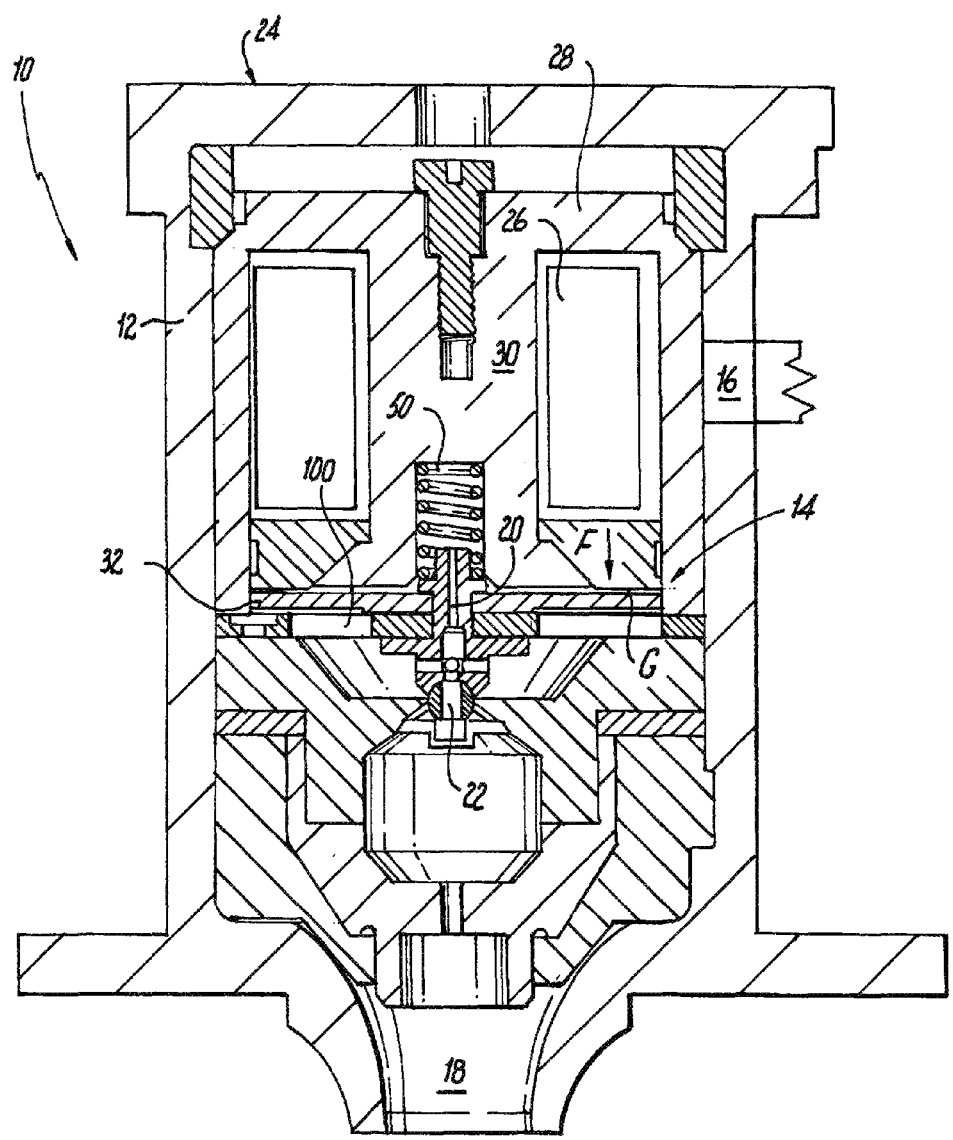
FIG. 1 is a cross-sectional elevation view of an exemplary embodiment of a valve constructed in accordance with the present disclosure, showing a flexure operatively connected between a valve member and a valve body of the valve.

Reference will now be made to the drawings wherein like reference numerals identify similar structural features or aspects of the subject disclosure. For purposes of explanation and illustration, and not limitation, a partial view of an exemplary embodiment of a flexure in accordance with the disclosure is shown in FIG. 1 and is designated generally by reference character 100. Other embodiments of flexures and valves in accordance with the disclosure, or aspects thereof, are provided in FIGS. 2-4, as will be described. The systems and methods described herein can be used for pressure-regulating valves and/or flow metering valves, such as in aircraft fuel systems.

Referring to FIG. 1, an exemplary valve is generally indicated with reference numeral 10. Valve 10 includes a valve body 12 with a fluid circuit 14. Fluid circuit 14 extends between a fluid inlet 16 and a fluid outlet 18. A valve member 20 with a ball element 22 is disposed within valve body 12 and is movable between first and second positions. In the first position (shown in solid line) valve member 20 positions such that ball element 22 limits or blocks entirely fluid communication between fluid inlet 16 and fluid outlet 18. In the second position (shown in dashed outline) valve member 20 positions ball element 22 such that fluid inlet 16 is in fluid communication with fluid outlet 18.

Valve 10 includes an electromagnet 24 with a solenoid 26 and a core member 28 operatively associated with valve member 20. Core member 28 includes a magnetic material 30 and at least a portion of the core member 28 is positioned axially within solenoid 26. A plunger 32 with a disk including a magnetic material is spaced from the core member by a gap G and movable with between first and second positions using an actuating force F developed by solenoid 26. Valve member 20 extends axially from plunger 32 and is axially movable with plunger 32 to regulate fluid flow through valve 10.

A flexure 100 is interposed axially between solenoid 26 and a valve member 20 and plunger 32. Flexure 100 is substantially planar and is configured to have a relatively high radial spring rate and a relatively low axial spring rate. In this respect flexure 100 exerts relatively high centering forces on valve member 20 throughout its movement range between first and second positions without significantly influencing rate control or applying an axial preload to valve member 20. A resilient member 50, illustrated in an exemplary fashion as a spring, is disposed between core member 28 and valve member 20. Resilient member 50 provides both rate control and an axial preload to valve member 20.

Figure 2:
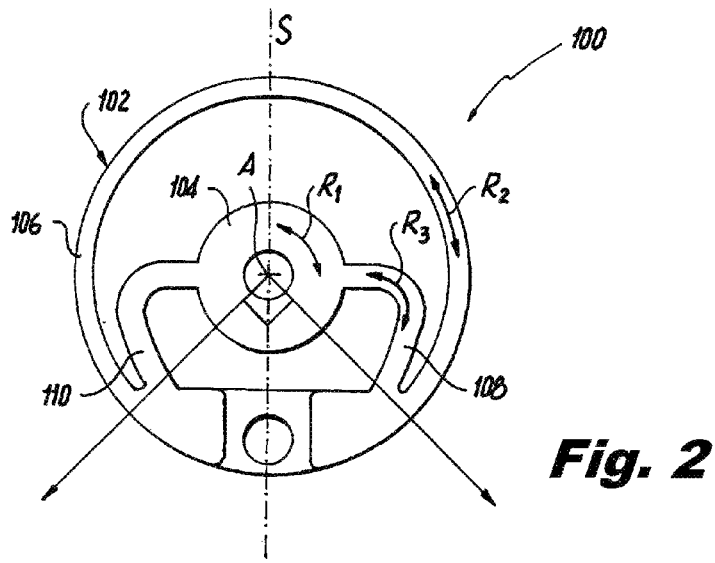
FIG. 2 is a plan view of the flexure of FIG. 1, showing an inner ring, an outer ring, and flexure members connecting the inner ring to the outer ring.

With reference to FIG. 2, flexure 100 is shown. Flexure 100 includes a flexure body 102. Flexure body 102 includes an inner ring 104, an outer ring 106, a first flexure member 108, and a second flexure member 110. Inner ring 104 defines a main axis A and connects to valve member 20 (shown in FIG. 1). Outer ring 106 extends about inner ring 104 outboard of inner ring 104 with respect to main axis A and connects to valve body 12. First flexure member 108 and second flexure member 110 connect inner ring 104 with outer ring 106 and nested between inner ring 104 and outer ring 106, reducing the size of flexure 100 relative the radial force exerted by flexure 100.

Inner ring 104 defines a main axis A of flexure 100 and has an inner ring radius of curvature $R_1$. Outer ring 106 has an outer ring radius of curvature $R_2$. First flexure member 108 has a flexure radius of curvature $R_3$ that is smaller than both radius of curvature $R_1$ of inner ring 104 and radius of curvature $R_2$ of outer ring 106. Second flexure member 110 is similar in arrangement to first flexure member 108 with the difference that second flexure member 110 mirrors first flexure member 108 about a symmetry axis S extending across flexure body 102 and intersecting main axis A. Second flexure member 110 couples to outer ring 106 on a side of symmetry axis S that is opposite that where first flexure member 108 connects to outer ring 106. First flexure member 108 and second flexure member 110 also connect to outer ring 106 on a common side of main axis A, i.e. with a separation angle that is less than 180 degrees about main axis A. In the illustrated exemplary embodiment the separation angle is about 90 degrees relative to main axis A.

Figure 3:
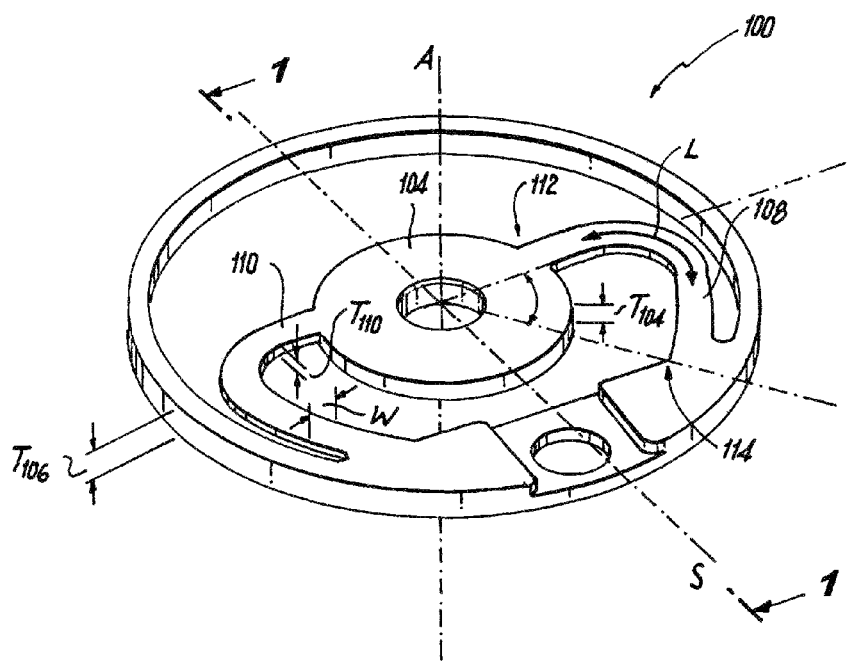
FIG. 3 is a perspective view of the flexure of FIG. 1, showing respective thicknesses of the inner ring, the outer ring, and the flexure members.

With reference to FIG. 3, flexure 100 is shown in a perspective view. First flexure member 108 extends between a first end 112 and a second end 114 and traces therebetween an arcuate path L between inner ring 104 and outer ring 106. First end 112 of first flexure member 108 is connected to inner ring 104. Second end 114 of first flexure member 108 is connected to outer ring 106. Arcuate path L has a length that is greater than the radial offset distance defined between inner ring 104 and outer ring 106. The length of arcuate path L is influenced in part by the angle spanned by first flexure member 108. In the illustrated exemplary embodiment, first flexure member spans and angle about main axis A that is greater than about 30 degrees. Second flexure member 110 is similar to first flexure member 108 in this respect with the difference that second flexure member 110 mirrors first flexure member 108 about symmetry axis S.

Second flexure member 110 has width W that that is greater than an axial thickness $T_{110}$ of second flexure member 110. Axial thickness $T_{110}$ is also smaller than an axial thickness $T_{104}$ of inner ring 104 and an axial thickness $T_{106}$ of outer ring 106. First flexure member 108 is similar to second flexure member 110 in this respect with the difference that first flexure member 108 mirrors second flexure member 110 about symmetry axis S.

Figure 4:
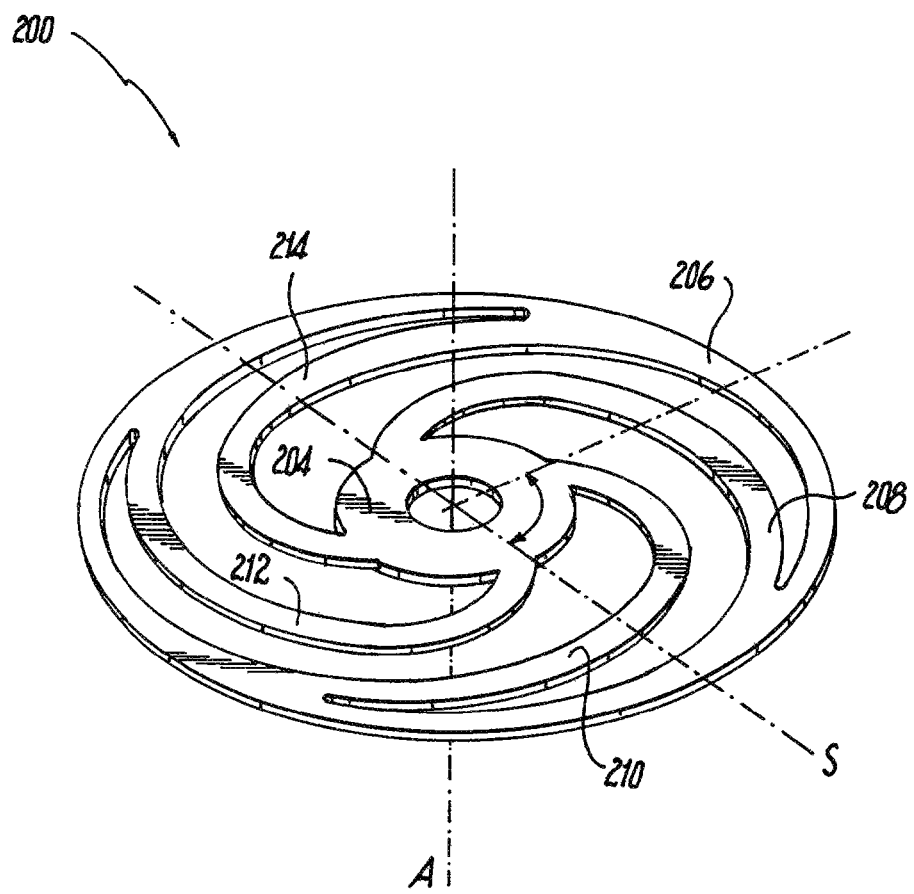
FIG. 4 is a perspective view of another embodiment of a flexure for a valve, showing flexure members connecting the inner ring to the outer ring in a spiraled arrangement.

With reference to FIG. 4, a flexure 200 is shown. Flexure 200 is similar to flexure 100, and additionally includes four flexure members, i.e. a first flexure member 208, a second flexure member 210, a third flexure member 212, and a fourth flexure member 214. The flexure members are similar the flexure members of flexure 100 (shown in FIG. 3) with the difference that first flexure member 208, second flexure member 210, third flexure member 212, and fourth flexure member 214 are uniformly distributed between inner ring 204 and outer ring 206 and span a greater angular range. In the illustrated exemplary embodiment, flexure members of flexure 200 span angular ranges that are about 180 degrees.

As will be appreciated by those of skill in the art in view of the present disclosure, flexure members 208-214 are longer than first flexure member 108 (shown in FIG. 2) and second flexure member 110 (shown in FIG. 2) of flexure 100 (shown in FIG. 2), and therefore generate smaller axial forces than the axial forces produced by first flexure member 108 and second flexure member 110. As will also be appreciated by those of skill in the art in view of the present disclosure, the arrangement of flexure members 208-214 about the entire periphery of the inner ring makes it more difficult for the inner ring to tip or rock (i.e. allow for off axis displacement) than the cantilevered arrangement of first flexure member 108 (shown in FIG. 2) and second flexure member 110 (shown in FIG. 2). In this response, flexure members 208-214 provide a simply supported inner ring arrangement whereas first flexure member 108 (shown in FIG. 2) and second flexure member 110 (shown in FIG. 2) provide a cantilevered arrangement support arrangement.

Conventional flexures for flow metering valves generally provide centering, axial preload, and rate control to valve assemblies. While satisfactory for their intended purpose, such flexures can require close tolerance and/or multiple flexures for a single valve assembly. In embodiments described herein, the axial preload and rate control functions have been shifted to a resilient member, simplifying manufacture of the flexure and/or reducing the number of flexures required for a given valve arrangement. In embodiments, the flexure member axial thickness, lateral width, and nested length cooperate to produce a low axial spring rate and provide a stiff radial spring rate. In certain embodiments, the flexures allow substantially free axial motion in solenoid actuated valve members, thereby enabling relatively small solenoid to actuate the valve member—thereby saving weight and reducing the size of the valve assembly.

The methods and systems of the present disclosure, as described above and shown in the drawings, provide for flexures and valves with superior properties including improved centering control of the movable valve member. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A flexure, comprising:
a flexure body, including:
an inner ring defining a main axis;
an outer ring extending about the inner ring outboard of the inner ring with respect to the main axis, wherein the inner ring and the outer ring are concentric about the main axis; and
only a first flexure member and a second flexure member connecting the connecting the inner ring to the outer ring, the the first flexure member and the second flexure member having lengths greater than a radial offset distance defined between the inner ring and the outer ring,
wherein the second flexure member mirrors the first flexure relative to a symmetry axis extending across the flexure body and intersecting the main axis, the second flexure member arranged on a side of the symmetry axis opposite the first flexure member and joining the inner ring at a location opposite the first flexure member,
wherein the inner ring is supported in a cantilevered arrangement relative to the outer ring by the first flexure member and the second flexure member, and
wherein axial thicknesses of the first flexure member and the second flexure member are less than axial thicknesses of the inner ring and the outer ring.

2. The flexure as recited in claim 1, wherein the inner ring and the outer ring are substantially coplanar.

3. The flexure as recited in claim 1, wherein at least one of the first flexure member and the second flexure member traces an arcuate path defined between the inner ring and the outer ring.

4. The flexure as recited in claim 1, wherein at least one of the first flexure member and the second flexure member spans an angle about the main axis that is greater than about 30 degrees.

5. The flexure as recited in claim 1, wherein a portion of of at least one of the first flexure member and the second flexure member has a segment with a radius of curvature that is smaller than a radius of curvature of the outer ring.

6. The flexure as recited in claim 1, wherein at least one of the first flexure member and the second flexure member has a segment with a radius of curvature that is smaller than a radius of curvature of the inner ring.

7. The flexure as recited in claim 1, wherein at least one of the first flexure member and the second flexure member has an axial thickness and a width, the width being greater than the axial thickness.

8. The flexure as recited in claim 1, wherein the second flexure member couples to the inner ring on a side of the symmetry axis opposite a location where the first flexure member couples to the inner ring.

9. The flexure as recited in claim 1, wherein at least one of the first flexure member and the second flexure member couple to the outer ring on a common side of the main axis.

10. The flexure as recited in claim 1, wherein at least one of the first flexure member and the second flexure member join the outer ring with an angular separation of about 90 degrees relative to the main axis.

11. A valve, comprising:
a valve body;
a plunger seated within the valve body;
a valve member coupled to the plunger and movable between a first position and a second position to meter fluid flow through the valve body;
a solenoid seated within the valve body and operably associated with the plunger to move the valve member between the first position and the second position; and
a flexure as recited in claim 1, wherein valve member is seated in the inner ring of the flexure and the outer ring of the flexure is fixed to the valve body such that the first flexure member and the second flexure member apply a relatively low axial spring rate and a relatively high radial spring rate on the valve member as the valve member moves between the first position and the second position.

12. The valve as recited in claim 11, further including a resilient member connected between the inner ring of the flexure body and the solenoid.

13. The valve as recited in claim 12, wherein the resilient member has an axial spring rate that is greater than an axial spring rate of the flexure.

* * * * *